(12) United States Patent
Takehara et al.

(10) Patent No.: US 7,165,654 B2
(45) Date of Patent: Jan. 23, 2007

(54) ENERGY STORAGE METHOD FOR LOAD HOISTING MACHINERY

(75) Inventors: Toru Takehara, San Mateo, CA (US); Kinya Ichimura, Foster City, CA (US)

(73) Assignee: Paceco Corp, Hayward, CA (US)

( * ) Notice: Subject to any disclaimer, the term of this patent is extended or adjusted under 35 U.S.C. 154(b) by 507 days.

(21) Appl. No.: 10/773,484

(22) Filed: Feb. 6, 2004

(65) Prior Publication Data

US 2005/0173198 A1    Aug. 11, 2005

(51) Int. Cl.
*B66B 1/06* (2006.01)
(52) U.S. Cl. .................................. 187/290; 187/296
(58) Field of Classification Search ............... 187/290, 187/247, 277, 289, 297; 318/372–381, 139
See application file for complete search history.

(56) References Cited

U.S. PATENT DOCUMENTS

| | | | | |
|---|---|---|---|---|
| 4,678,063 A | * | 7/1987 | Kitaoka et al. | 187/296 |
| 5,058,710 A | * | 10/1991 | Iwasa | 187/290 |
| 5,285,029 A | * | 2/1994 | Araki | 187/290 |
| 5,712,456 A | * | 1/1998 | McCarthy et al. | 187/290 |
| 5,936,375 A | * | 8/1999 | Enoki | 318/727 |
| 6,435,312 B2 | * | 8/2002 | Tajima et al. | 187/290 |
| 6,732,838 B1 | * | 5/2004 | Okada et al. | 187/290 |

* cited by examiner

*Primary Examiner*—Jonathan Salata
(74) *Attorney, Agent, or Firm*—Bruce & McCoy; Ernest H. McCoy

(57) ABSTRACT

A method for energy storage and recovery for load hoisting equipment powered by an induction hoist motor controlled by a first inverter and having a dual inverter controlling a capacitor utilizing rest power such as reverse power generated from the motor when lowering a load, and unused power at small load or idle, to charge the capacitor whereby energy is stored in the capacitor and the system is reversed when a load is lifted and power is consumed whereby the capacitor is discharged to deliver power to the hoist motor.

4 Claims, 4 Drawing Sheets

ENERGY STORAGE METHOD FOR LOAD HOISTING MACHINERY

BACKGROUND OF THE INVENTION

1. Field of the Invention

The present invention relates to improvements in a patented energy storage method for use with cranes and other load hoisting machinery. More particularly, it relates to improvements in a method for storing energy in a capacitor which is charged by the load hoisting machinery drive motor. The stored energy is resupplied to the system when the load is being raised and needs more power.

2. Description of the Prior Art

The present invention relates to improvements in a system or method for energy storage in load hoisting cranes which are driven by electrical power. It is particularly useful for machinery which is driven by diesel-electric generators that experience a wide range of varying loads. The system stores energy at reverse or small load and supplies power at peak or large loads. Theoretically, this is a simple mechanical query, having as a result the benefit that the primary electrical source is only required to supply relatively constant average power and is not required to supply peak power. However, until now, the practical aspects of the query have prevented its use.

Combination battery and generator energy storage systems have been utilized to accomplish this result in the past, and theoretically they are very effective. However, in reality, the battery component imposes numerous problems such as: small electrical capacity, electrical inefficiency, large physical battery volume, heavy weight, and short battery life, whereby such a system is not currently a viable way to accomplish energy storage utilizing even state-of-the-art battery technology.

Flywheel type energy storage systems have also been utilized to accomplish the result. However, in order for the flywheel to store energy to create power, it must be capable of being driven over a wide range of speeds. In order to transmit the energy to the flywheel at the variable speeds, a DC motor has been utilized as most suitable, but the DC motor-driven flywheel has not been proven satisfactory for numerous reasons among which the following are most limiting:

1. In order for the flywheel to store energy, the energy is measured by $\frac{1}{2} \times I \times \omega^2$ where I=the moment of inertia, and ω=the rotating angular speed. Therefore, high rotating speeds can store much more energy in the flywheel because the energy is measured by a square of the rotational speed. However, the DC motor which must be interconnected to the flywheel has severe rotational speed limitations due to the weak centrifugal strength of its rotor's coil component;

2. The DC motor requires continuous maintenance such as brush replacement, commutator repair, and maintaining insulation integrity;

3. A DC motor is comparatively large, heavy, and expensive.

For these reasons and others, the flywheel-driven energy storage type system utilizing a DC motor has likewise not been a viable way to accomplish the result.

Recent developments in inverter technology have progressed to the point where AC squirrel cage induction motors using inverters are replacing DC motors. The inverter converts DC to AC with arbitrary frequency and also converts AC to DC in reverse. By virtue of the AC arbitrary frequency, the AC squirrel cage induction motor can rotate with arbitrary rotational speed up to very high speeds solving some of the described problems associated with DC motors.

FIG. 1 of the drawings shows a typical example of currently utilized diesel-generator power sources and inverter controlled induction motor drive machinery for load hoisting machinery. The diesel engine 11 is mechanically interconnected to an AC generator 13. The alternating current output from the generator is converted to direct current by a diode 15. The DC, in turn, is converted to AC with an arbitrary frequency by the inverter 17. A squirrel cage induction motor 19 is driven by the AC and, in turn, drives a drum 21 which raises or lowers a load 23. The raising and lowering speeds are controlled as a result of the alternating current frequency generated and controlled by the inverter. When the load is lowered, reverse AC current is generated by the induction motor. The reverse current is consumed by a resistor 25 in order for the induction motor to operate effectively as degenerative braking.

FIG. 2 of the drawings discloses a typical example of current from a municipal utility power grid 27 being fed to the system by a cable reel power supply 29 instead of from the diesel engine/generator combination of FIG. 1. The incoming voltage is lowered by a transformer 31. The alternating current is then converted to DC by a DC converter 16 and, from that point on, the system is the same as disclosed in FIG. 1 of the drawings.

During lowering of the load 23, reverse current is sent back to the power grid 27 and, in this example, is used by other consumers. However, since the reverse power current includes surge and deviant frequencies, other consumers dislike receiving it. It is expected that in the future sending reverse power back to the power grid may be prohibited. In that event, the reverse power will be consumed by a resistor, the same as disclosed in the system of FIG. 1.

FIG. 3 of the drawings discloses the improvement on the prior art which is inserted into the system in place of the resistor as utilized in FIG. 1 of the prior art systems. It is disclosed in U.S. Pat. No. 5,936,375, issued Aug. 10, 1999, for a Method for Energy Storage for Load Hoisting Machinery. The present invention includes further non-obvious improvements on that design.

SUMMARY OF THE INVENTION

The method of the present invention is provided for the desired purpose of energy storage and recovery for load-moving machinery systems powered by an induction motor which is controlled by a first inverter. The steps of the method of the invention comprise driving the induction motor of the load-moving machinery to act as a generator and create reverse power when the machinery is lowering or braking a load. The generated reverse power combined with unused power, which occurs when the machinery is at small load or idle, the combined powers being defined as rest power, is utilized to charge a capacitor to store the rest power potential energy. The rest power is controlled by a dual inverter which charges the capacitor or delivers current back to the first inverter when the capacitor discharges. The potential energy of the capacitor is measured, and the voltage of the system is measured at the power input side of the first inverter. The potential energy value and the measured voltage are transmitted to a programmable logic controller (PLC). The PLC controls the dual inverter so as to convert AC to DC so that the capacitor can be charged and the rest power can be stored for reuse in the capacitor. Power can then be retrieved from the potential energy of the capacitor to drive the induction motor depending on the capacitor measured energy. The capacitor is discharged whereby the induction motor is rotated to produce power for lifting a load. In other words, power is returned to the induction motor when it is consuming power in excess of average power consumption.

The present invention also includes new apparatus for performing the method thereof. The load moving machinery energy storage system is comprised of an induction motor interconnected to a wire rope drum for raising and lowering a load. The motor is controlled by a first inverter. The energy storage system includes (a) a capacitor for storing and discharging energy which is controlled by a dual inverter, (b) a programmable logic controller (PLC) controlling the dual inverter, (c) means for sensing voltage at the power input side of the first inverter and for sensing voltage in the capacitor, and (d) programmed logic for the PLC for comparing the sensed voltage and the output of the pulse generator with a set voltage value. An engine driven AC generator (ACG) produces power for the load moving machinery, and a diode controls the AC output of the ACG.

OBJECTS OF THE INVENTION

It is therefore an important object of the present invention to provide an improved method for energy storage for the operation of induction motor-driven hoist machinery to reduce the overall power requirements for the operation of the machinery.

It is another object of the present invention to provide an improved method for energy storage for the operation of induction motor-driven hoist machinery to average out the power consumption requirements of the machinery.

It is a further object of the present invention to provide a method for the operation of induction motor-driven hoist machinery that eliminates the need to send power back to the source when the motor is driven by lowering the load or to absorb the power in a resistor or a brake.

It is still another object of the present invention to provide a method for energy storage for the operation of the induction motor-driven hoist machinery that can utilize a flywheel for electrical energy storage.

And it is yet a further object of the present invention to provide an apparatus for an induction motor-driven hoist machinery energy storage system that employs a capacitor to store the energy.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
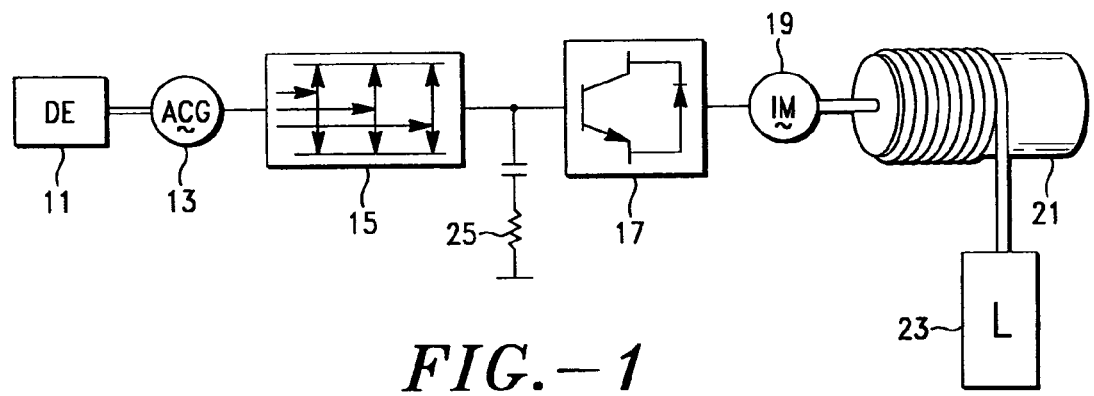
FIG. 1 is a diagram of a standard prior art drive machinery arrangement for an autonomous load-hoisting crane.
Figure 2:
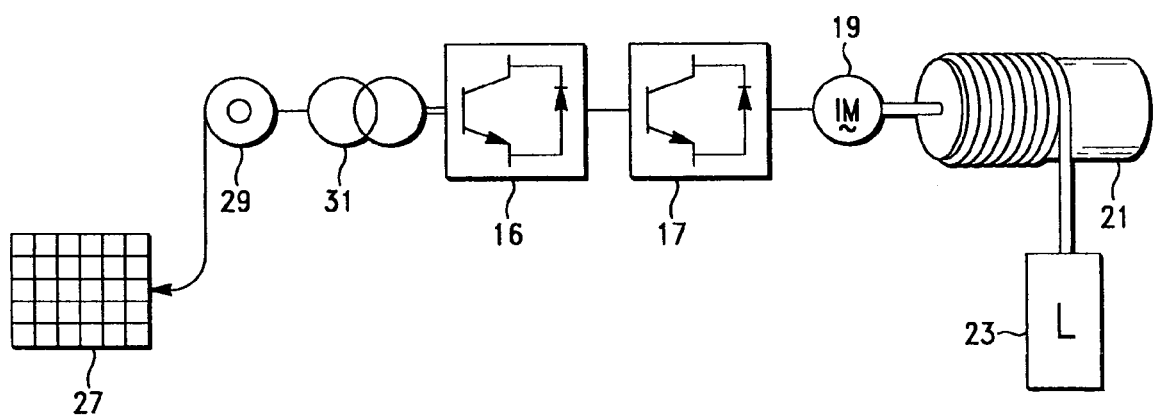
FIG. 2 is a diagram of an alternative standard prior art drive machinery arrangement for an electrical power-driven crane.
Figure 3:
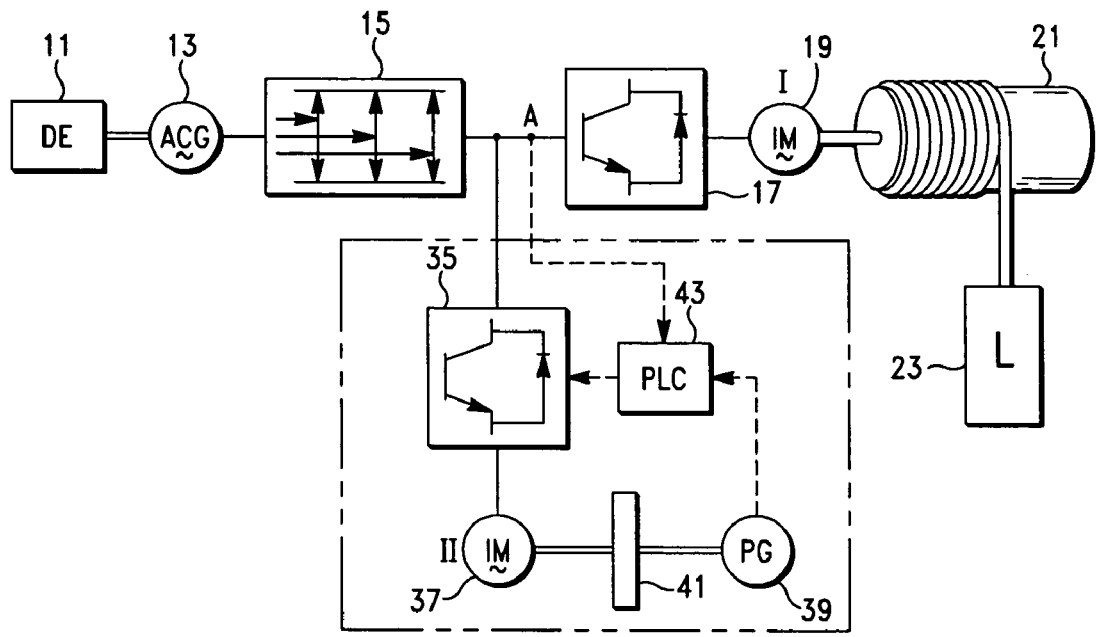
FIG. 3 is a diagram of a patented prior art method for energy storage for load hoisting machinery.

FIGS. 1–3 show the prior art of present practices as described above in the DESCRIPTION OF THE PRIOR ART portion of this specification. FIG. 3 shows the prior art patented apparatus which modifies the apparatus of FIG. 1 by the additions shown within the broken lines. The description of FIG. 1 in the DESCRIPTION OF THE PRIOR ART describes the operation of the primary apparatus items 11, 13, 15, 17, 19, 21 and 23.

Reference is made to FIG. 3 for a description of the environment of the present invention. When a load 23 is raised by the hoist machinery 21 of the system, in both the prior art and the present invention, electrical energy from either a municipal utility power grid or from an autonomous diesel engine powered generator 13 is utilized to operate a first induction motor 19 which is connected by a mechanical power transmission means to the load hoist wire rope drums 21. Power is consumed by the induction motor during hoisting the load and generated by it during lowering of the load.

The patented energy storage system is shown in FIG. 3 encircled by the broken line and is comprised of added machinery, which replaces the resistor 25 of FIG. 1, including: a second inverter 35, a second induction motor 37, a tachometer or pulse generator 39 which detects the rotational speed, a flywheel 41, and a programmable logic controller (PLC) 43.

When a load is being lowered by the hoist machinery 19 and 21, energy is stored in the rotation of the flywheel 41. This occurs from the following obvious relationships: the load hoist drum 21 reverse drives its hoist motor, the system's first induction motor 19, during lowering of the load 23. The first induction motor acts as a generator creating AC current or reverse power. The generated AC current is converted to DC by the first inverter 17 and the DC current flows between the diode 15 and the first inverter 17. As a result, the voltage at the point A becomes high.

The voltage at the point A also becomes high when the load hoist machinery is at idle, stopping, or hoisting a light load. Electricity supplied from the main power source, the AC generator or the municipal utility power grid, through the diode 15 elevates the voltage at the point A when the power consumption of the load hoist machinery is quite small or almost zero. This creates unused power. When the load hoist machinery hoists a heavy load, and its power consumption is large, the voltage at the point A becomes lower due to the lack of electricity.

The energy storage system works so as to store both the unused power and the generated reverse power produced by the first induction motor 19 when it is driven to act as a generator when lowering a load. The combined unused power and the reverse power are defined for purposes herein as rest power.

The rest power is controlled by a second inverter 35. A second induction motor 37 is driven by the rest power and is controlled by the second inverter to rotate the flywheel 41. The rest power is stored in the flywheel rotational energy when the voltage at point A is high. The system works so as to retrieve power from the flywheel rotational energy and supply the lack of electricity when the voltage at the point A is low.

The measured voltage at point A, and the rotational speed detected by a tachometer or pulse generator 39 which is connected to the flywheel 41, are transmitted or inputted to the programmable logic controller (PLC) 43. The PLC controls the second inverter 35 so as to convert DC to AC with a controlled frequency. The frequency is controlled by a programmed logic in the PLC depending on the voltage at point A and the rotational speed of the flywheel. The voltage at the point A is compared with a set voltage value $V_0$ which can be pre-set manually in the programmed logic.

Figure 4:
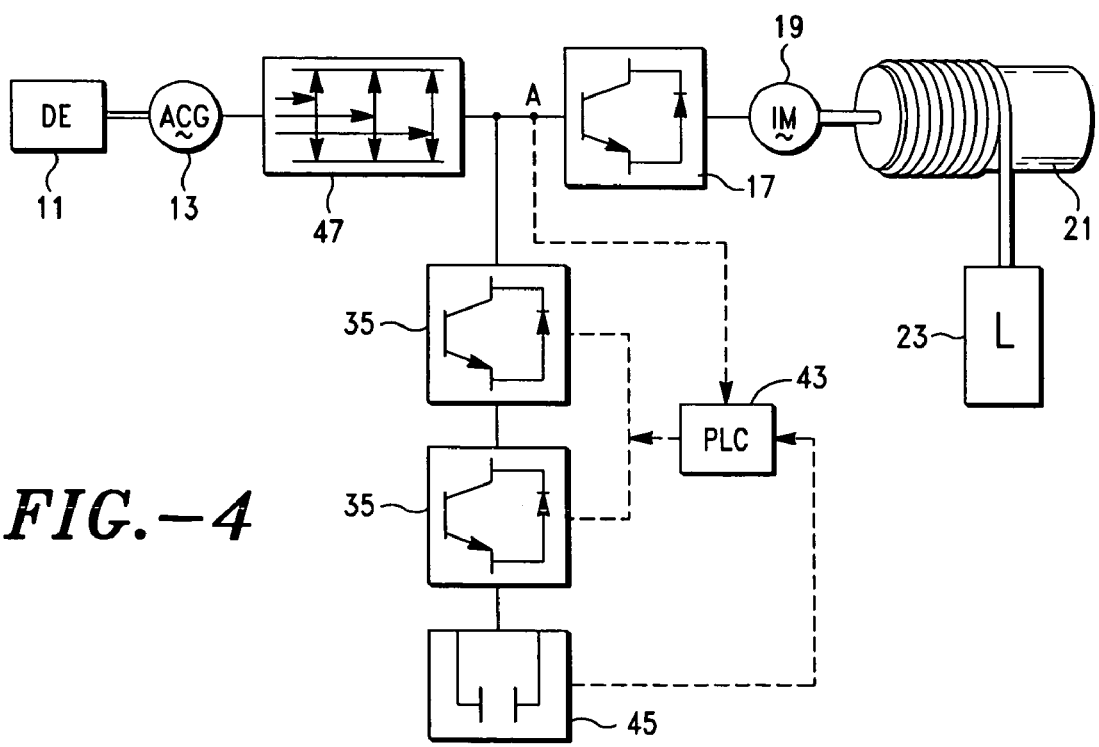
FIG. 4 is a modification of the prior art of FIG. 3 showing the inclusion of the capacitor/condenser energy storage system of the present invention therein.

Further reference is made to FIG. 3 of the drawings. The present invention eliminates a portion of the expensive and complicated apparatus of the patented prior art invention shown therein which includes the second induction motor 37, the flywheel 41, and the pulse generator 39. Reference is made to FIG. 4 of the drawings which shows the additional and alternative apparatus of the present invention inserted into the apparatus of the prior art and present practice as shown in FIGS. 1–3. The patented prior art apparatus of FIG. 3 is shown as modified by the technology of the FIG. 4 invention. A capacitor or condenser 45 is substituted for the three prior items 37,39,41, and a dual inverter 35 is substituted in FIG. 4 for the second inverter 35 of FIG. 3. This greatly simplifies the apparatus construction, and generally reduces the overall cost.

FIG. 4 shows the embodiment of apparatus of the present invention wherein if the voltage at point A is higher than the set or predetermined value $V_O$, the PLC 43 commands the dual inverter 35 to convert the output from the first inverter to DC whereby the capacitor 45 is charged and power is stored as potential energy. If the voltage at the point A is lower than the set value $V_O$, the dual inverter controls the capacitor whereby it is discharged, thereby generating power which is supplied to the induction motor 19 whereby energy is recovered from the capacitor.

The dual inverter 35 of FIG. 4 which controls the capacitor 45 is in turn controlled by the PLC 43 to effect delivery of the DC output of the capacitor 45 to the first inverter 17 also as DC for conversion by the first inverter to controlled AC to drive the induction motor 19 and the reverse.

Figure 5:
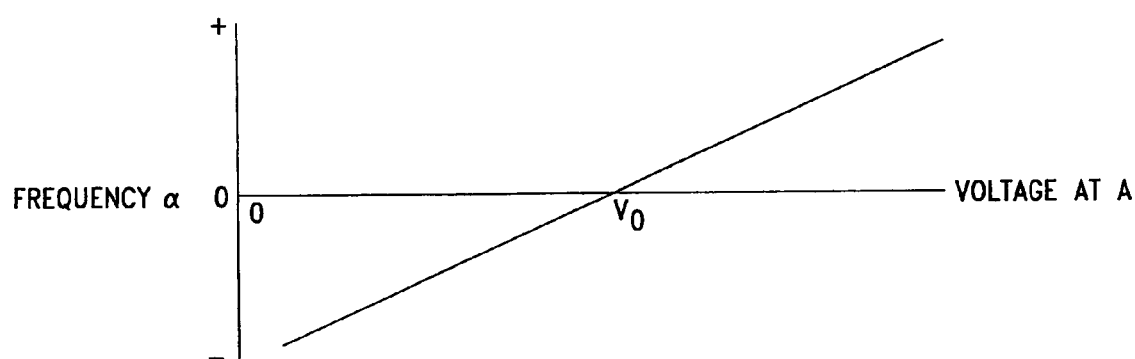
FIG. 5 is a graph showing the relationship of the frequency alpha and the voltage at point A in FIGS. 3–4 by which the second inverter controls AC frequency.
Figure 6:
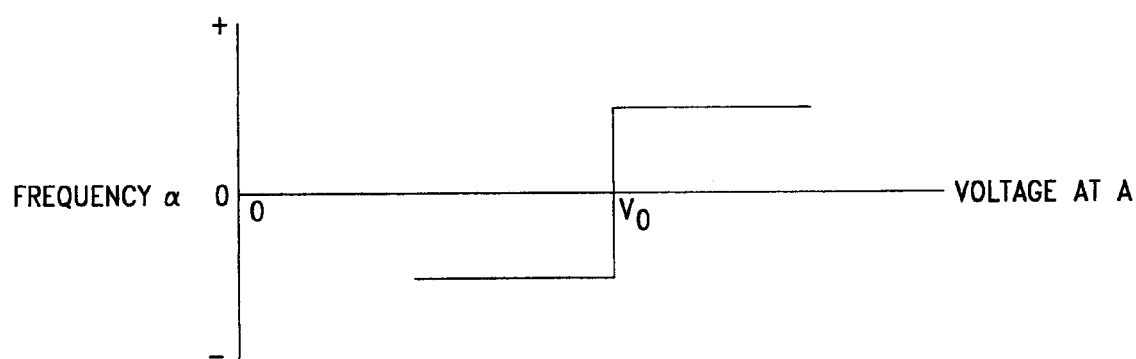
FIG. 6 is the basic relationship for the operation of the graph of FIG. 5.
Figure 7:
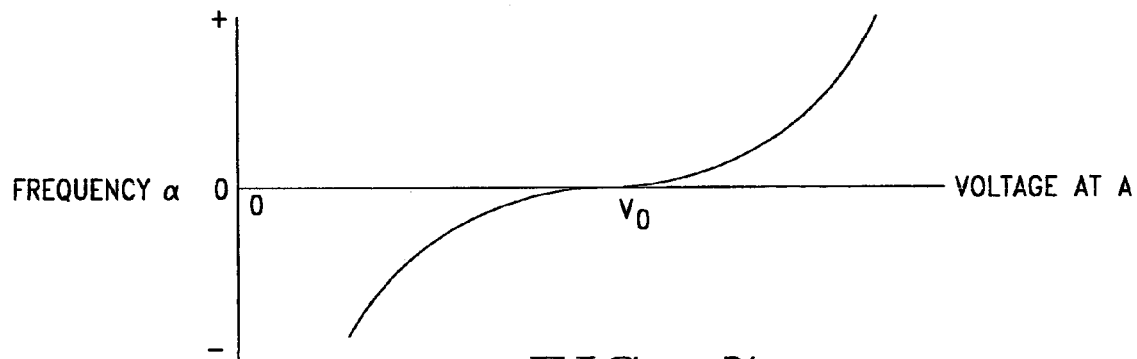
FIG. 7 is a more realistic relationship of the graph of FIG. 5 which is suitable for complex load variation in the operation of a crane.

Reference is made to FIGS. 5–7, as well as FIGS. 3 & 4, for the relationships of voltage at point A to the AC frequency alpha. The variable graph representations are set forth in the DESCRIPTION OF THE DRAWINGS. The frequency of alpha is determined depending upon the voltage at A. When the load on the hoist drum is small and there is no large power consumption, or reverse power results by the load being lowered, the voltage at A becomes higher than the set value $V_O$ in the controller which is close to the average voltage. In that event, the frequency alpha becomes a plus and energy is stored in the capacitor. When the load is large and power is consumed, the voltage at A becomes lower than the set value $V_O$, and the frequency alpha becomes minus and energy is retrieved from the flywheel rotation.

When the voltage at A is the set value $V_O$, neither storage nor retrieval of energy is effected by the energy storage system. The set value $V_O$ is determined by the average load and mechanical and electrical efficiency. The reduced capacity requirements for the diesel engine and the AC generator permitted by the invention for the operation of the load hoisting machinery can be determined from the average load and mechanical and electrical efficiencies of the machinery.

Figure 8:
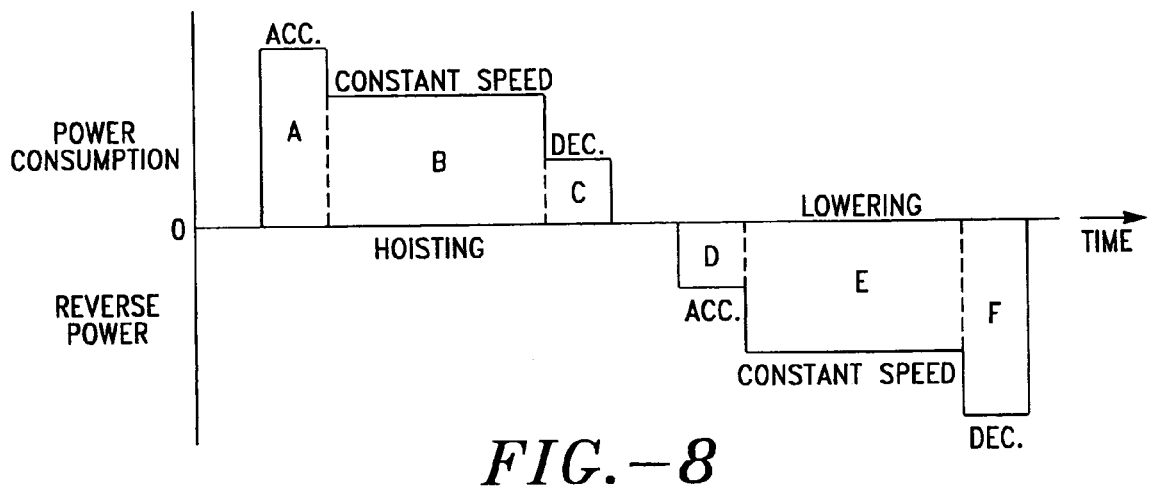
FIG. 8 is a basic power consumption graph for a standard prior art load moving machinery arrangement.

Reference is made to FIG. 8 which shows a graphical power consumption profile especially adaptable for the present invention. It can be utilized for load moving machinery where the loads being moved vary in large amounts or where large inertia changes occur due to acceleration and deceleration of the load, such as in hoisting machines, cranes, tractors, trains, etc. In case of a hoisting machine or a crane, a variable weight load is raised and lowered, and in doing so, the load is accelerated and decelerated. The power consumption of the induction motor for such operation with a specific load is shown graphically illustrated in FIG. 8 where: block A represents the power consumption required to accelerate the load to lift speed; block B represents the power consumption to move and lift the load at constant speed; block C represents the power consumption to stop the movement of the load; block D represents the reverse power or braking effect to permit the load to accelerate to lowering speed; block E represents the reverse power/braking effect to permit the load to lower at constant speed; and block F represents the reverse power/braking effect to stop the lowering of the load. When the load is hoisted, the system consumes power. When the load is lowered, the motor operates to generate power and act as a brake.

Figure 9:
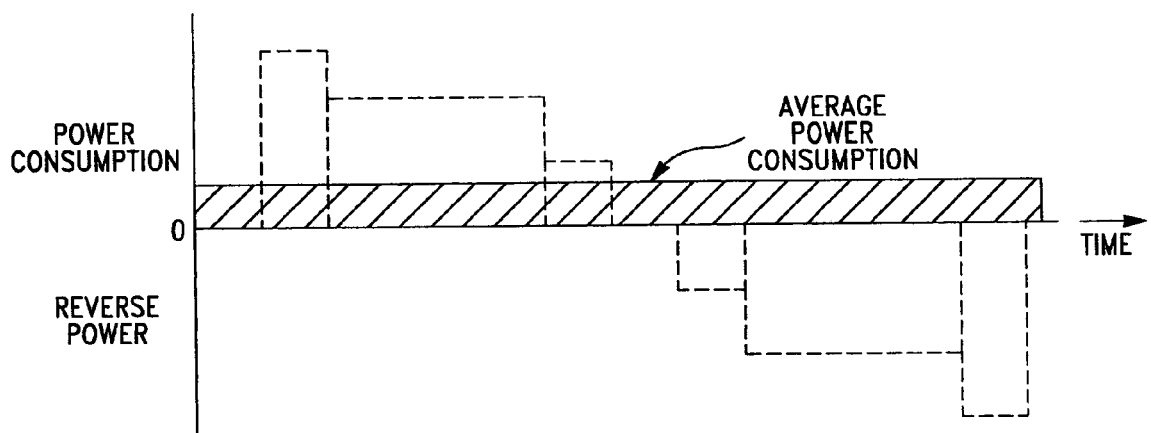
FIG. 9 is an idealistic power consumption graph representation for a drive machinery arrangement utilizing the method of the present invention.

Reference is made to FIG. 9 which shows the graphical power consumption profile which can be achieved with the use of the present invention. Power input is constant and there is unused power when the machinery is not lifting a load, such as when it is idling or at rest but not shut down. The average power consumption is represented by the cross-hatched area of FIG. 9 superimposed on the power consumption graph of FIG. 8.

Figure 10:
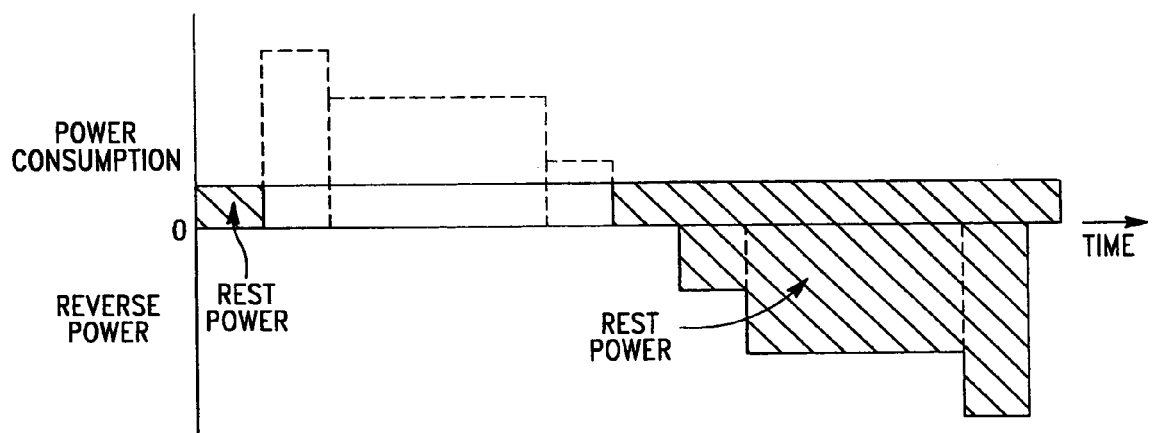
FIG. 10 is a power consumption graph of FIG. 10 defining rest power and showing the power to be stored.

FIG. 10 shows a graphical profile of rest power which is stored in the system of the present invention. When the energy storage system of the present invention is utilized, the rest power, including reverse power and unused power at small load or idle, is stored as flywheel rotation energy and the stored energy is retrieved as power in the peak load or large load situations. The rest power is represented by the reverse cross-hatched area in FIG. 10. The capacity of the main power source is sufficient to supply the average consuming power as shown in FIG. 9. If the load is lowered the same height as hoisted, the average power consumption is just mechanical and electrical efficiency losses.

The present invention comprises a method for energy storage and recovery for load moving machinery powered by an induction motor which is controlled by a first inverter. The steps comprise driving the induction motor to act as a generator and create reverse power when lowering or braking a load. The reverse power combined with unused power, when the load hoisting machinery is at small load or idle, is defined as rest power. The rest power is utilized for charging a capacitor which is controlled by a dual inverter. The capacitor is discharged to supply power to the induction motor when the motor is consuming power in excess of its average power consumption.

The method of the present invention also includes measuring the energy (voltage) stored in the capacitor and measuring the voltage at the power input side of the first inverter which controls the induction motor. The capacitor energy measurement and the measured voltage at the inverter input are transmitted to a programmable logic controller. The measured voltage is compared in the controller with a preset value for determining whether the capacitor should be charged or discharged to drive or be driven by the induction motor. The method further includes that if the controller determines that the measured voltage at the power input side of the first inverter is higher than the set value, the dual inverter converts the output of the first inverter to charge the capacitor whereby energy is stored in the capacitor. Accordingly, if the voltage is lower than the set value, the dual inverter converts and controls the output of the capacitor delivered to the first inverter to supply the induction motor with power recovered from the capacitor.

Therefore, the energy storage system of the present invention is very effective so as to permit the reduction of the capacity of the diesel engine and the AC generator, or the amount of the draw from the power source, and which thereby contributes to an effective energy in addition to providing a less expensive load hoist apparatus by the present invention, the energy storage system of the present invention is very effective so as to permit the reduction of the capacity of the diesel engine and the AC generator, or the amount of the draw from the power source, and which thereby contributes to an effective energy utilization and savings. Also, in the case that the power source is not stable and fluctuates, the energy storage system of the invention can be used as a power stabilizer.

The present invention also includes new and novel apparatus for performing the method of the present invention. The load moving machinery energy storage system is comprised of an induction motor interconnected to a wire rope drum for raising and lowering a load. The motor is controlled by a first inverter. The energy storage system includes (a) a capacitor for storing and discharging energy which is controlled by a dual inverter, (b) a programmable logic controller (PLC) controls the dual inverter, (c) means for sensing voltage at the power input side of the first inverter and for sensing voltage in the capacitor, and (d) programmed logic for the PLC for comparing the sensed voltage and the output of the pulse generator with a set voltage value. The energy storage system also includes an engine driven AC generator (ACG) producing power for the load moving machinery and a diode controls the AC output of the ACG.

Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A method for energy storage and recovery for load moving machinery powered by an induction motor which is controlled by a first inverter, the steps comprising
   driving said induction motor to act as a generator and create reverse power when lowering or braking a load, said reverse power combined with unused power when said load hoisting machinery is at small load or idle, said combined powers being defined as rest power,
   utilizing said rest power for charging a capacitor,
   controlling said rest power by a dual inverter, and
   discharging said capacitor to supply power to said induction motor when said motor is consuming power in excess of its average power consumption.

2. The method of claim 1 including
   measuring the energy stored in said capacitor,
   measuring the voltage at the power input side of said first inverter,
   transmitting said energy value of said stored energy and said measured voltage to a programmable logic controller, and
   comparing said measured voltage in said controller with a preset value for determining whether said capacitor should be charged or discharged.

3. The method of claim 2 wherein said controller determines that if the measured voltage at the power input side of said first inverter is higher than said set value, said dual inverter converts the output of said first inverter to charge said capacitor, and if said voltage is lower than said set value, said dual inverter converts and controls the output of said capacitor delivered to said first inverter to supply said induction motor with power from said capacitor.

4. A load moving machinery energy storage system comprising
   an induction motor interconnected to a wire rope drum for raising and lowering a load, said motor controlled by a first inverter,
   an energy storage system including
      a capacitor for storing and discharging energy, said capacitor being controlled by a dual inverter,
      a programmable logic controller (PLC) controlling said dual inverter,
      means for sensing voltage at the power input side of said first inverter and for sensing voltage in said capacitor,
      programmed logic for said PLC for comparing said sensed voltages with a set voltage value,
   an engine driven AC generator (ACG) producing power for said load moving machinery, and
   a diode controlling the AC output of said ACG.

* * * * *